United States Patent [19]

Yoshimura et al.

[11] Patent Number: 5,510,661
[45] Date of Patent: Apr. 23, 1996

[54] MOTOR

[75] Inventors: Noriyuki Yoshimura; Yutaka Daikuhara, both of Nagano, Japan

[73] Assignee: Minebea Kabushiki-Kaisha, Nagano, Japan

[21] Appl. No.: 226,275

[22] Filed: Apr. 11, 1994

[30] Foreign Application Priority Data

Apr. 13, 1993 [JP] Japan .................... 5-109875

[51] Int. Cl.⁶ ...................................... H02K 5/16
[52] U.S. Cl. .................. 310/90; 310/42; 310/67 R
[58] Field of Search ............... 310/42, 90, 67 R, 310/273, 261, 264

[56] References Cited

U.S. PATENT DOCUMENTS

| | | | |
|---|---|---|---|
| 4,204,594 | 5/1980 | Banno | 198/827 |
| 4,741,091 | 5/1988 | Settles | 29/525 |
| 5,128,571 | 7/1992 | Itsu | 310/67 R |
| 5,138,209 | 8/1992 | Chuta et al. | 310/67 R |
| 5,160,866 | 11/1992 | Hishida et al. | 310/90 |
| 5,357,160 | 10/1994 | Kaneda et al. | 310/67 R |

*Primary Examiner*—Mark O. Budd
*Attorney, Agent, or Firm*—Frishauf, Holtz, Goodman, Langer & Chick

[57] ABSTRACT

In a motor having a spindle (5) on which an inner race (8) of a ball bearing is mounted, an outer peripheral surface of an end of the spindle (5) has a knurled portion (16) on which is mounted the inner race (8) which is fixed to the spindle (5) through an adhesive (18) filled in a clearance between an inner surface of the inner race (8) and the knurled portion (16). An annular groove (19), formed in the spindle (5) in an area adjacent to the knurled portion (16), is also filled with the adhesive (18) to further fix the inner race (8) to the spindle (5), which improves the adhesive bond between the inner race (8) and the spindle (5). Even when the ball bearing is a miniature one having a thin-wall inner race (8), there is no fear of deformation of the inner race (8) when the adhesive (18) is cured, which improves the rotational accuracy of the rotor.

8 Claims, 3 Drawing Sheets

FIG. 5 (a) Prior Art
FIG. 5 (b) Prior Art
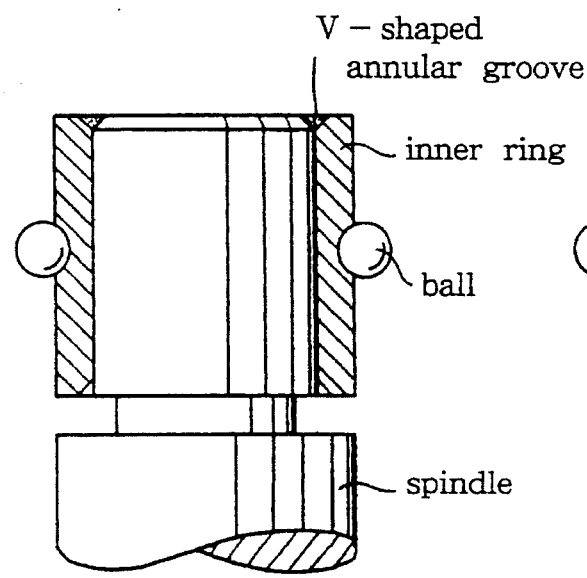
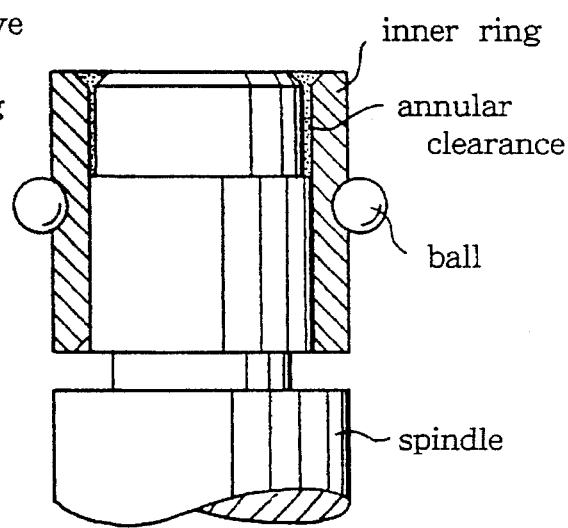

MOTOR

BACKGROUND OF THE INVENTION

1. Field of the Invention

The present invention relates mainly to a motor employed in office automation instruments.

2. Description of the Prior Art

Fixedly mounted on a spindle of a conventional motor is an inner race of a ball bearing which is constructed of: an outer race; the inner race disposed inside the outer race; and, a plurality of balls disposed between the outer race and the inner race. The inner race mounted on the spindle of the motor is generally fixed thereto by the use of a suitable adhesive, as follows:

(a) As shown in FIG. 5(a), an annular groove, which is formed between a chamfered outer end portion of the spindle and a corresponding chamfered inner end portion of the inner race of the ball bearing to assume a V-shaped form in cross section, is filled with the adhesive which is permitted to flow into an annular clearance formed between an outer peripheral surface of the spindle and an inner peripheral surface of the inner race of the ball bearing and be cured therein so as to fix the inner race of the ball bearing to the spindle of the motor.

However, this first approach is not adequate, because the adhesive filled the annular groove does not sufficiently flow into the annular clearance formed between the spindle and the inner race of the ball thus provides a poor adhesive bond therebetween.

(b) As shown in FIG. 5(b), a small-diameter portion is formed in an end portion of the spindle to form a relatively large annular clearance between the outer peripheral surface of the small-diameter portion of the spindle and the inner peripheral surface of the inner race of the ball bearing. Then, the adhesive filled in the end annular groove assuming the V-shaped form in cross section is permitted to flow into such relatively large annular clearance and be cured therein so as to fix the inner race of the ball bearing to the spindle of the motor.

Consequently, in the motor of a normal size, this second approach is adequate, because the annular clearance formed between the inner race and the spindle can be sufficiently filled with the adhesive to provide a good adhesive bond therebetween.

In this second approach, however, when the adhesive is applied to an inner race of a miniature ball bearing mounted on a spindle to a miniature motor, the inner race of the miniature motor is deformed when the adhesive is cured. Consequently, the second approach is not adequate in case of the miniature motor.

SUMMARY OF THE INVENTION

It is an object of the present invention to provide a motor excellent in rotational accuracy, which motor is: free from disadvantages inherent in the conventional motors described above; excellent in adhesive bond between an inner race of a ball bearing and a spindle of a motor so as to fix the inner race to the spindle in a reliable manner; and free from a fear of deformation of the inner race due to curing of the adhesive even when the inner race is a miniature one which is extremely thin in wall thickness.

The motor of the present invention is provided with a spindle on which an inner race of a ball bearing is mounted. An outer peripheral surface of an end portion of the spindle is knurled to form a knurled portion on which is an inner race of a ball bearing is mounted. An adhesive is permitted to flow into an annular clearance formed between such knurled portion of the spindle and an inner surface of the inner race of the ball bearing, and cured therein so that the inner race of the ball bearing is fixed to the spindle of the motor. In the motor of the present invention, further provided is an annular groove disposed axially adjacent to the knurled portion of the spindle. The adhesive may flow also into this annular groove and fill it to further improve the adhesive bond between the inner race of the ball bearing and the spindle of the motor.

BRIEF DESCRIPTION OF THE DRAWINGS

FIG. 5(a) is a partially broken side view of the conventional motor spindle, illustrating the inner race mounted on the spindle end; and FIG. 5(b) is a partially broken side view of the conventional motor spindle, illustrating the inner race mounted on the spindle end provided with the small-diameter end portion.

DESCRIPTION OF THE PREFERRED EMBODIMENTS

Hereinbelow, the present invention will be described in detail with reference to embodiments of a magnetic disk unit of the present invention shown in the accompanying drawings.

Figure 1:
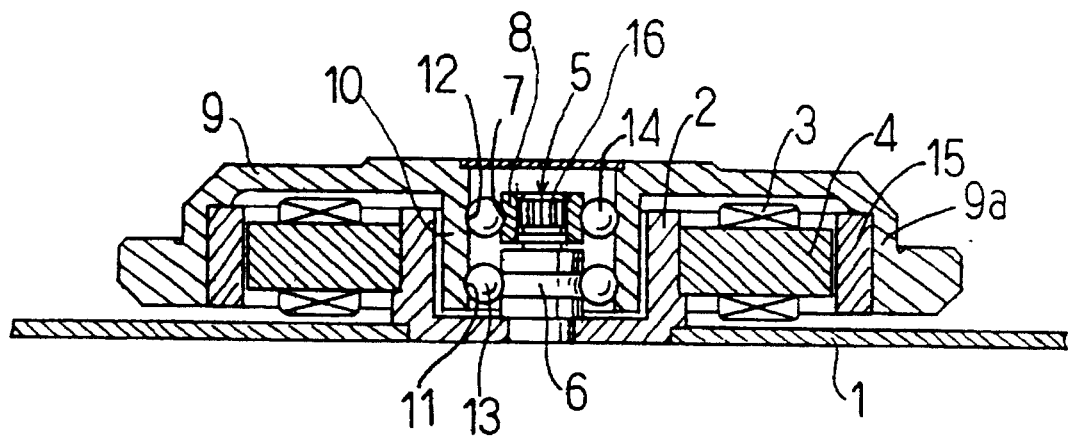
FIG. 1 is a longitudinal sectional view of an outer-rotor type motor of the present invention.

In FIG. 1, there is shown an outer-rotor type motor of the present invention, in which the reference numeral 1 denotes a base. A sleeve-like yoke holder 2 provided with a bottom portion is mounted on a central portion of the base 1. Disposed around the yoke holder 2 is a stator yoke 4 which is provided with an energizing coil 3.

A spindle 5 has its lower portion fixedly mounted in a center hole of the bottom portion of the yoke holder 2 and has its upper portion formed into a small-diameter shaft portion so that the spindle 5 is constructed of a lower large-diameter shaft portion and the upper small-diameter shaft portion to form a stepped shaft.

Formed in an outer peripheral portion of the lower large-diameter shaft portion of the spindle 5 is a ball-running groove 6. An inner race 8 of the ball bearing unit is fitted to the small-diameter shaft portion of the spindle 5, and is provided with a ball-running groove 7 in its outer peripheral portion.

A sleeve portion 10 for a main body of a ball bearing unit is integrally formed with a rotor 9 and extends downward from a lower surface of a central portion of the rotor 9. Formed in an inner surface of the sleeve portion 10 of the rotor 9 are a pair of ball-running grooves 11 and 12 which are oppositely disposed from the ball-running grooves 6 and 7, respectively. The ball-running groove 6 is of the large-diameter shaft portion of the spindle 5; while the ball-running groove 7 is of the inner race, 8 of the ball bearing unit. A plurality of balls 13 are disposed between the ball-running grooves 6 and 11, while a plurality of balls 14 are disposed between the ball-running grooves 7 and 12. As is clear from the above description, the main body of the ball bearing unit is constructed of the sleeve portion 10 of the rotor 9, balls 13 and 14 and the ball-running grooves 6 and 7 so that the rotor 9 is rotatably mounted on the spindle 5.

Incidentally, in the drawings, the reference numeral 15 denotes a magnet which is mounted on an inner surface of a flange portion 9a of the rotor 9 so as to be oppositely disposed from the stator yoke 4.

Figure 2:
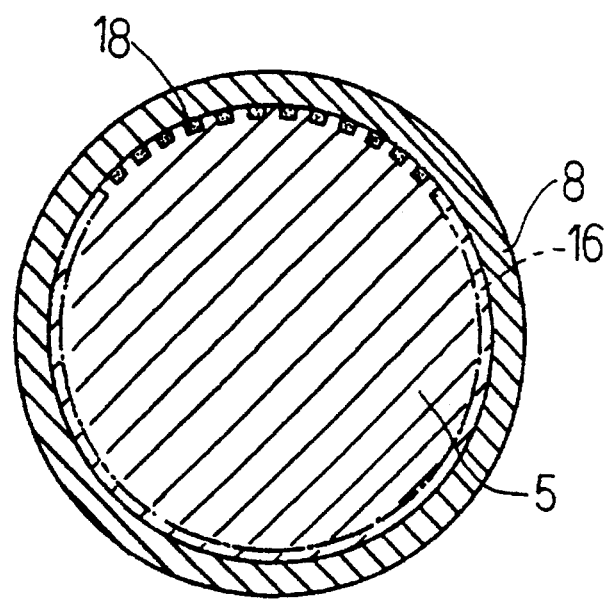
FIG. 2 is an enlarged cross-sectional view of the inner race of the ball bearing mounted on the knurled portion of the spindle of the motor of the present invention shown in FIG. 1.
Figure 3:
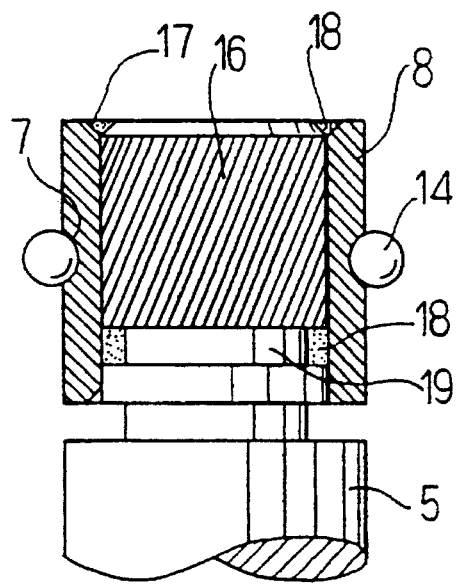
FIG. 3(a) is a partially broken side view of the motor of the present invention, illustrating the knurled portion in the pattern of oblique lines.
FIG. 3(b) is a partially broken side view of the motor spindle of the present invention, illustrating the knurled portion in the pattern of diamonds.
Figure 3:
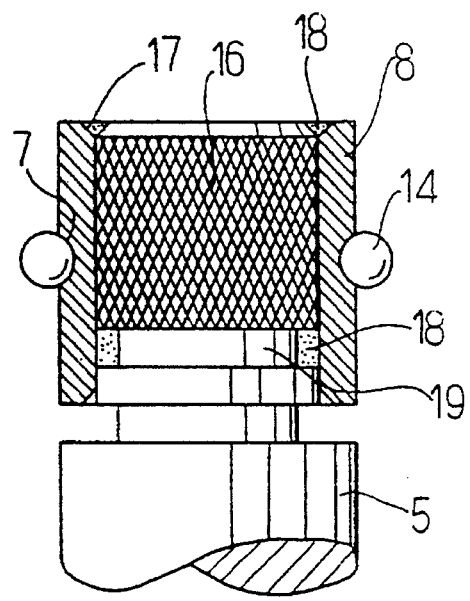

In the present invention, an upper-end outer peripheral edge of the small-diameter portion of the spindle is chamfered to form a chamfered portion. On the other hand, an outer peripheral surface of the small-diameter portion of the spindle is knurled to form a knurled portion 16. As shown in FIGS. 3(a) and 3(b), an adhesive, for example such as anaerobic adhesive 18, is permitted to fill an annular groove 17 which is formed between the chamfered portion of the of the upper end of the small-diameter portion of the spindle 5 and the inner peripheral surface of the upper end of the inner race 8 of the ball bearing. As is clear from FIGS. 3(a) and 3(b), the annular groove 17 assumes a V-shaped form in its cross section. The adhesive 18 thus filled in the annular groove 17 then flows into the spaces 26 (FIG. 2) defined by the knurled portion 16 of the small-diameter portion of the spindle 5, and is then dried and cured therein so as to fix the inner race 8 to the spindle 5.

As for the pattern of the knurled portion 16, in addition to the pattern of straight lines arranged parallel to the rotational axis of the spindle 5 as shown in FIG. 1, the knurled portion 16 may comprise: the pattern of oblique lines angled relative to the rotational axis of the spindle 5, as shown in FIG. 3(a); and the pattern of diamonds as shown in FIG. 3(b). All of these patterns preferably open at the upper groove 17 (see FIGS. 3(a) and 3(b)) so that the adhesive 18 in the groove 17 can flow into the spaces 26 (FIG. 2) defined by the knurled portion 26. Of these patterns, the pattern of straight lines shown in FIG. 1 is most preferable.

An additional annular groove 19 is formed in the small-diameter portion of the spindle 5 in an area adjacent to the knurled portion 16 of the spindle 5. The adhesive 18 is also permitted to fill such additional annular groove 19 to further improve the adhesive bond between the inner race 8 of the ball bearing and the small-diameter portion of the spindle 5.

Incidentally, prior to curing of the adhesive 18, the inner race 8 of the ball bearing is press-fitted to the spindle 5 from the upper side thereof by applying a force to the inner race 8 so that the inner race 8 is adequately positioned relative to the spindle 5. As seen in FIG. 2, the inner race 8 is press fitted around the outermost projecting surface portions of 26 of the knurled portion 16. The depression or spaces 27 between the outermost projecting surface portions 26 of the knurled portion 16 are filled with the adhesive 18.

Figure 4:
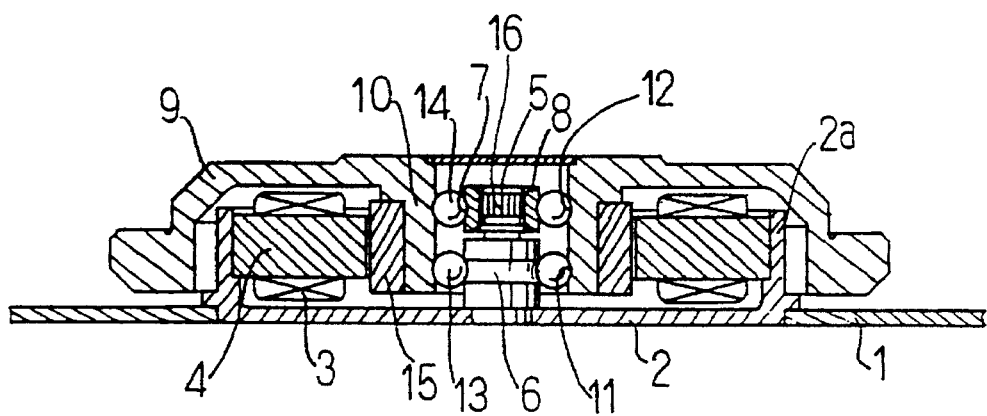
FIG. 4 is a longitudinal sectional view of an inner-rotor type motor of the present invention.

FIG. 4 shows an inner-rotor type spindle motor of the present invention. As shown in FIG. 4, the spindle 5 constructed of a stepped shaft is mounted in a central hole of a bottom portion of the stator yoke holder 2 so as to extend upward from the bottom portion of the holder 2 which is provided with a sleeve-like rib portion 2a. The stator yoke 4 is mounted on an inner peripheral surface of the rib portion 2a of the stator yoke holder 2.

In this embodiment of the present invention shown in FIG. 4, the sleeve portion 10 of the main body of the ball bearing unit is integrally formed with the rotor 9 in the lower surface of the central portion of the rotor 9.

The remaining construction of the main body of the ball bearing unit of the embodiment shown in FIG. 4 is the same as that of the main body of the ball bearing unit of the embodiment shown in FIG. 1, with the exception of the magnet 15 which is mounted on the outer peripheral portion of the sleeve portion 10 of the ball bearing unit in the embodiment as shown in FIG. 4.

Also formed in the embodiment of the present invention shown in FIG. 4 are the knurled portion 16 of the spindle 5 and the annular groove 19 of the spindle 5. The inner race 8 of the ball bearing is fixed to the knurled portion 16 of the spindle 5 through the adhesive filled in the knurled portion 16 and the annular groove 19 of the spindle 5.

In the ball bearing of the motor of the present invention shown in FIGS. 1 and 4, the sleeve portion 10 of the rotor 9 also serves as an outer race of the ball bearing. Although this ball bearing is a unique product of the applicant's company, it may be a conventional one constructed of a normal inner and a normal outer race and a plurality of balls disposed therebetween.

Incidentally, as shown in FIG. 1, in an inner or on an upper surface of the flange portion 9a of the rotor 9, there may be provided a printed circuit board connected with the coil 3 for actuating the motor. Such a printed circuit board is omitted in the drawings to clarify the essential parts of the present invention.

In the present invention, since the knurled portion 16 of the spindle 5, on which the inner race 8 of the ball bearing is mounted, has its entire outer peripheral surface covered with a layer of the adhesive 18, the adhesive bond formed between the inner race 8 and the knurled portion 16 of the spindle 5 is increased in bonding area and bonding strength, which makes it possible to fix the inner race 8 to the spindle 5 in a reliable manner and to improve the motor in rotational accuracy.

Further, when the ball bearing of the present invention is a miniature one, there is no fear of deformation of the inner race 8 even when the adhesive 18 is cured, because the knurled portion 16 of the spindle 5 has its outer diameter formed within the allowable fitting tolerance of the inner race 8 of the ball bearing. Consequently, it is possible for the present invention to provide a motor which is excellent in rotational accuracy.

What is claimed is:

1. In a motor provided with a spindle to which an inner race of a ball bearing is fitted, the improvement wherein:

said spindle has an outer peripheral knurled surface portion at an outer end portion thereof, said knurled surface portion having outermost surface portions and spaces defined between said outermost surface portions;

said inner race of said ball bearing is mounted on said knurled surface portion of said spindle with inner surface portions of said inner race in contact with said outermost surface portions of said knurled surface portion;

clearances are defined between inner surface portions of said inner race and said spaces of said knurled surface portion of said spindle;

an adhesive is filled in said clearances and is cured, and through which said inner race of said ball bearing is fixed to said spindle of said motor;

said spindle has an annular groove in an area adjacent to said knurled portion and remote from an outer end of said spindle;

said inner race of said ball bearing is mounted on said spindle so as to cover said knurled portion and said annular groove of said spindle with a space defined between said groove and said inner surface of said inner race; and said adhesive is filled in said space between the inner surface of said inner race and said annular groove of said spindle, to improve fixing of said inner race to said spindle.

2. The motor of claim 1, wherein said adhesive is an anaerobic adhesive.

3. The motor of claim 1, wherein said spaces of said knurled surface portion open at an outer end of said spindle to permit said adhesive to flow into said spaces.

4. The motor of claim 1, wherein said outermost surface portions and spaces of said knurled surface portion have a pattern of substantially straight lines arranged substantially parallel to a rotation axis of said spindle.

5. The motor of claim 1, wherein said outermost surface portions and spaces of said knurled surface portion has a pattern of oblique lines arranged at an angle relative to the rotation axis of said spindle.

6. The motor of claim 1, wherein said outermost surface portions and spaces of said knurled surface portion define a diamond pattern.

7. The motor of claim 1, wherein said inner race is press fitted over said outermost surface portions of said knurled surface portion.

8. The motor of claim 7, wherein said spaces of said knurled surface portion open at an outer end of said spindle to permit said adhesive to flow into said spaces.

* * * * *